United States Patent
Johnsen et al.

(10) Patent No.: US 8,743,890 B2
(45) Date of Patent: Jun. 3, 2014

(54) SYSTEM AND METHOD FOR SUPPORTING SUB-SUBNET IN AN INFINIBAND (IB) NETWORK

(75) Inventors: Bjørn-Dag Johnsen, Oslo (NO); Line Holen, Fetsund (NO); Lars Paul Huse, Oppegård (NO); Ola Tørudbakken, Oslo (NO); Bartosz Bogdanski, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 54 days.

(21) Appl. No.: 13/488,133

(22) Filed: Jun. 4, 2012

(65) Prior Publication Data

US 2012/0307682 A1 Dec. 6, 2012

Related U.S. Application Data

(60) Provisional application No. 61/493,330, filed on Jun. 3, 2011.

(51) Int. Cl.
  *H04L 12/28* (2006.01)

(52) U.S. Cl.
  USPC ......... 370/400; 370/254; 370/352; 370/395.2

(58) Field of Classification Search
  USPC .................. 370/254, 400, 401, 404; 709/224; 710/316; 713/600; 714/5
  See application file for complete search history.

(56) References Cited

U.S. PATENT DOCUMENTS

| | | |
|---|---|---|
| 5,805,805 A | 9/1998 | Civanlar et al. |
| 6,748,429 B1 | 6/2004 | Talluri et al. |
| 6,941,350 B1 | 9/2005 | Frazier et al. |
| 6,963,932 B2 | 11/2005 | Bhat |
| 6,978,300 B1 | 12/2005 | Beukema et al. |
| 6,981,025 B1 | 12/2005 | Frazier et al. |
| 6,985,956 B2 | 1/2006 | Luke et al. |
| 7,069,468 B1 | 6/2006 | Olson |
| 7,185,025 B2 | 2/2007 | Rosenstock et al. |
| 7,200,704 B2 | 4/2007 | Njoku et al. |
| 7,216,163 B2 | 5/2007 | Sinn |

(Continued)

FOREIGN PATENT DOCUMENTS

| | | |
|---|---|---|
| EP | 2 051 436 A1 | 4/2009 |
| EP | 2160068 A1 | 3/2010 |
| WO | 01/90838 A2 | 11/2001 |
| WO | 2012037518 | 3/2012 |

OTHER PUBLICATIONS

InfiniBandSM Trade Association, InfiniBandTM Architecture Specification, vol. 1, Release 1.2.1, Nov. 2007, pp. 1-1727.*

(Continued)

*Primary Examiner* — Brian D Nguyen
*Assistant Examiner* — Toan Nguyen
(74) *Attorney, Agent, or Firm* — Meyer IP Law Group

(57) ABSTRACT

A system and method can support multiple domains in an InfiniBand (IB) fabric. The IB fabric can include one or more subnets, wherein each said subnet contains one or more switch nodes. Additionally, at least one said subnet can be divided into one or more sub-subnets, wherein each said sub-subnet is managed by a separate sub-subnet manager that is associated with a unique management key, and wherein said one or more sub-subnets are connected by one or more sub-subnet gateway switch nodes, wherein each sub-subnet gateway switch node belongs to one sub-subnet.

20 Claims, 4 Drawing Sheets

(56) References Cited

U.S. PATENT DOCUMENTS

| | | |
|---|---|---|
| 7,231,518 B1 | 6/2007 | Bakke |
| 7,290,277 B1 | 10/2007 | Chou et al. |
| 7,356,841 B2 | 4/2008 | Wilson et al. |
| 7,409,432 B1 | 8/2008 | Recio et al. |
| 7,437,447 B2 | 10/2008 | Brey et al. |
| 7,493,409 B2 | 2/2009 | Craddock et al. |
| 7,500,236 B2 | 3/2009 | Janzen |
| 7,633,955 B1 | 12/2009 | Saraiya et al. |
| 7,634,608 B2 | 12/2009 | Droux |
| 7,685,385 B1 | 3/2010 | Choudhary et al. |
| 7,724,748 B2 | 5/2010 | Davis |
| 7,860,961 B1 | 12/2010 | Finkelstein et al. |
| 7,873,711 B2 | 1/2011 | Adams et al. |
| 8,327,437 B2 | 12/2012 | McAlister |
| 8,331,381 B2 | 12/2012 | Brown et al. |
| 8,549,281 B2 | 10/2013 | Samovskiy et al. |
| 2002/0059597 A1 | 5/2002 | Kikinis et al. |
| 2002/0120720 A1 | 8/2002 | Moir |
| 2003/0009487 A1 | 1/2003 | Prabakaran et al. |
| 2003/0093509 A1 | 5/2003 | Li et al. |
| 2003/0105903 A1 | 6/2003 | Garnett et al. |
| 2003/0120852 A1* | 6/2003 | McConnell et al. .......... 710/316 |
| 2004/0249928 A1 | 12/2004 | Jacobs et al. |
| 2005/0071709 A1* | 3/2005 | Rosenstock et al. .............. 714/5 |
| 2005/0091396 A1 | 4/2005 | Nilakantan et al. |
| 2005/0105554 A1 | 5/2005 | Kagan et al. |
| 2005/0182853 A1 | 8/2005 | Lewites et al. |
| 2005/0198250 A1 | 9/2005 | Wang |
| 2005/0273641 A1* | 12/2005 | Sandven et al. ............... 713/600 |
| 2006/0079278 A1 | 4/2006 | Ferguson et al. |
| 2006/0195560 A1 | 8/2006 | Newport |
| 2008/0031266 A1 | 2/2008 | Tallet et al. |
| 2008/0183853 A1 | 7/2008 | Manion et al. |
| 2008/0250125 A1 | 10/2008 | Brey et al. |
| 2009/0049164 A1 | 2/2009 | Mizuno |
| 2009/0327462 A1 | 12/2009 | Adams et al. |
| 2010/0138532 A1* | 6/2010 | Glaeser et al. ................ 709/224 |
| 2011/0072206 A1 | 3/2011 | Ross et al. |

OTHER PUBLICATIONS

International Search Report dated Sep. 23, 2013 for Application No. PCT/US2013/040639, 10 pages.

International Search Report dated Sep. 26, 2013 for Application No. PCT/US2013/040656, 10 pages.

Lee, M., Security Enhancement in Infiniband Architecture, IEEE, vol. 19, Apr. 2005, pp. 1-18.

* cited by examiner

SYSTEM AND METHOD FOR SUPPORTING SUB-SUBNET IN AN INFINIBAND (IB) NETWORK

CLAIM OF PRIORITY

This application claims the benefit of priority on U.S. Provisional Patent Application No. 61/493,330, entitled "STATEFUL SUBNET MANAGER FAILOVER IN A MIDDLEWARE MACHINE ENVIRONMENT" filed Jun. 3, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting an InfiniBand (IB) network.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method that can support multiple domains in an InfiniBand (IB) fabric. The IB fabric can include one or more subnets, wherein each said subnet contains one or more switch nodes. Additionally, at least one said subnet can be divided into one or more sub-subnets, wherein each said sub-subnet is managed by a separate sub-subnet manager that is associated with a unique management key, and wherein said one or more sub-subnets are connected by one or more sub-subnet gateway switch nodes, wherein each sub-subnet gateway switch node belongs to one sub-subnet.

DETAILED DESCRIPTION

Described herein is a system and method that can support multiple independent domains in an interconnected network, such as an InfiniBand (IB) network.

Figure 1:
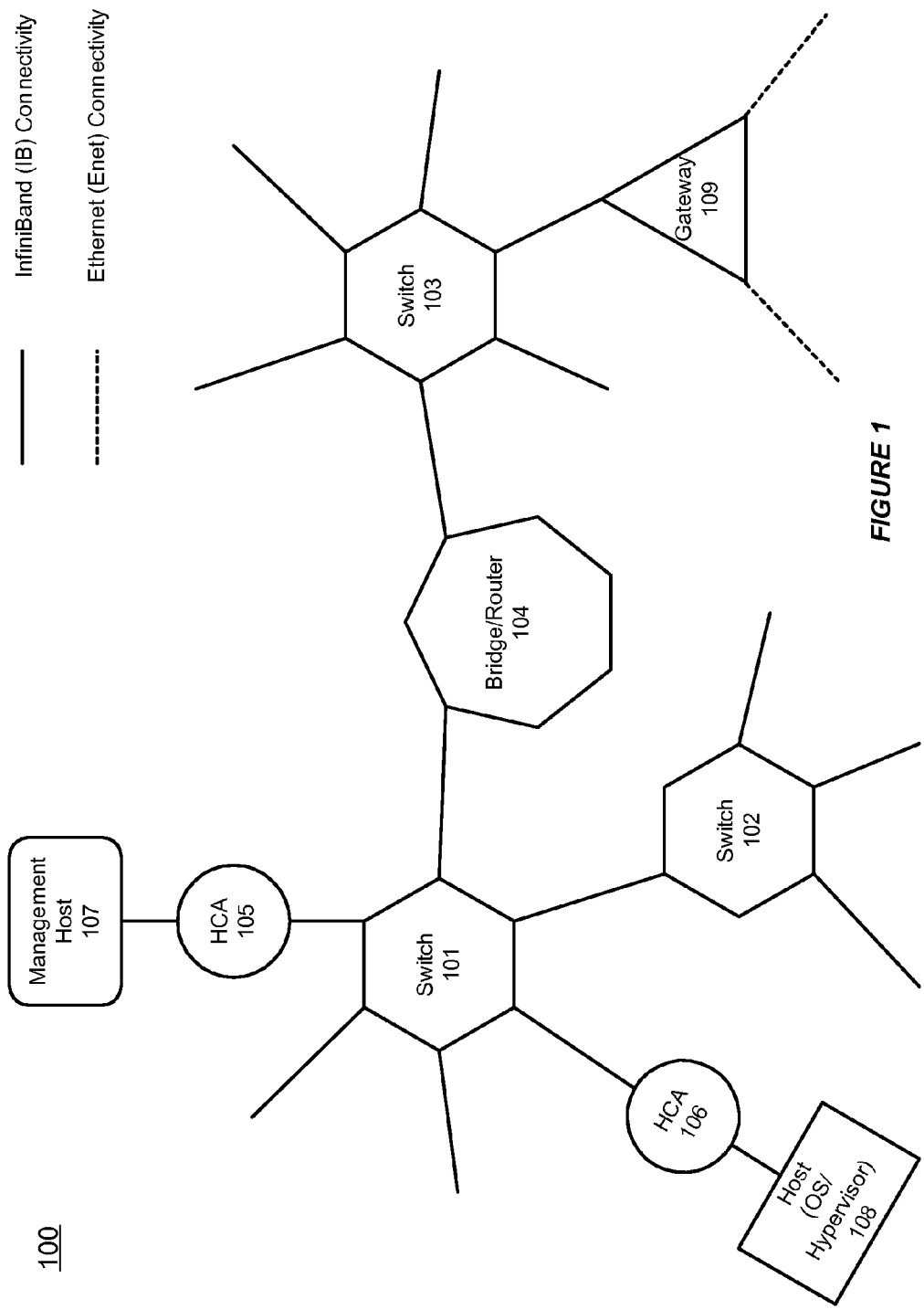
FIG. 1 shows an illustration of a fabric model in a middleware environment in accordance with an embodiment of the invention.

FIG. 1 shows an illustration of a fabric model in a middleware environment in accordance with an embodiment of the invention. As shown in FIG. 1, an interconnected network, or a fabric 100, can include switches 101-103, bridges and routers 104, host channel adapters (HCAs) 105-106 and designated management hosts 107. Additionally, the fabric can include, or be connected to, one or more hosts 108 that are not designated management hosts.

The designated management hosts 107 can be installed with HCAs 105-106, a network software stack and relevant management software in order to perform network management tasks. Furthermore, firmware and management software can be deployed on the switches 101-103, and the bridges and routers 104 to direct traffic flow in the fabric. Here, the host HCA drivers, OS and Hypervisors on hosts 108 that are not designated management hosts may be considered outside the scope of the fabric from a management perspective.

The fabric 100 can be in a single media type, e.g. an IB only fabric, and be fully connected. The physical connectivity in the fabric ensures in-band connectivity between any fabric components in the non-degraded scenarios. Alternatively, the fabric can be configured to include Ethernet (Enet) connectivity outside gateway (GW) external ports on a gateway 109. Additionally, it is also possible to have independent fabrics operating in parallel as part of a larger system. For example, the different fabrics can be only indirectly connected via different HCAs or HCA ports.

InfiniBand (IB) Architecture

IB architecture is a serial point-to-point technology. Each of the IB networks, or subnets, can include a set of hosts interconnected using switches and point-to-point links. A single subnet can be scalable to more than ten-thousand nodes and two or more subnets can be interconnected using an IB router. The hosts and switches within a subnet are addressed using local identifiers (LIDs), e.g. a single subnet may be limited to 49151 unicast addresses.

An IB subnet can employ at least one subnet manager (SM) which is responsible for initializing and starting up the subnet including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

At the time of initialization, the SM starts in the discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (e.g. a trap) can be forwarded to the SM and the SM can reconfigure the network. Part of the reconfiguration process, or a heavy sweep process, is the rerouting of the network which can be performed in order to guarantee full connectivity, deadlock freedom, and ensure proper load balancing between all source and destination pairs.

The HCAs in an IB network can communicate with each other using queue pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, a Send Queue (SQ) and a Receive Queue (RQ). There is one such pair present at each end-node that is participating in the communication. The send queue holds work requests to be transferred to the remote node, while the receive queue holds information on what to do with the data received from the remote node. In addition to the QPs, each HCA can have one or more Completion Queues (CQs) that are associated with a set of send and receive queues. The CQ holds completion notifications for the work requests posted to the send and receive queue.

The IB architecture is a flexible architecture. Configuring and maintaining an IB subnet can be carried out via special in-band subnet management packets (SMPs). The functionalities of a SM can, in principle, be implemented from any node in the IB subnet. Each end-port in the IB subnet can have an associated subnet management agent (SMA) that is responsible for handling SMP based request packets that are directed to it. In the IB architecture, a same port can represent a SM instance or other software component that uses SMP based communication. Thus, only a well defined sub-set of SMP operations can be handled by the SMA.

SMPs use dedicated packet buffer resources in the fabric, e.g. a special virtual lane (VL15) that is not flow-controlled (i.e. SMP packets may be dropped in the case of buffer overflow). Also, SMPs can use either the routing that the SM sets up based on end-port Local Identifiers (LIDs), or SMPs can use direct routes where the route is fully defined by the sender and embedded in the packet. Using direct routes, the packet's path goes through the fabric in terms of an ordered sequence of port numbers on HCAs and switches.

The SM can monitor the network for changes using SMAs that are presented in every switch and/or every HCA. The SMAs communicate changes, such as new connections, disconnections, and port state changes to the SM using traps and notices. A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

The subnet administrator (SA) is a subnet database associated with the master SM to store different information about a subnet. The communication with the SA can help the end-node to establish a QP by sending a general service management datagram (MAD) through a designated QP, .e.g. QP1. Both sender and receiver require information such as source/destination LIDs, service level (SL), maximum transmission unit (MTU), etc. to establish communication via a QP. This information can be retrieved from a data structure known as a path record that is provided by the SA. In order to obtain a path record, the end-node can perform a path record query to the SA, e.g. using the SubnAdmGet/SubnAdmGetable operation. Then, the SA can return the requested path records to the end-node.

The IB architecture provides partitions as a way to define which IB end-ports should be allowed to communicate with other IB end-ports. Partitioning is defined for all non-SMP packets on the IB fabric. The use of partitions other than the default partition is optional. The partition of a packet can be defined by a 16 bit P_Key that consists of a 15 bit partition number and a single bit member type (full or limited).

The partition membership of a host port, or an HCA port, can be based on the premise that the SM sets up the P_Key table of the port with P_Key values that corresponds to the current partition membership policy for that host. In order to compensate for the possibility that the host may not be fully trusted, the IB architecture also defines that switch ports can optionally be set up to do partition enforcement. Hence, the P_Key tables of switch ports that connect to host ports can then be set up to reflect the same partitions that the host port is supposed to be a member of. (i.e. in essence equivalent to switch enforced VLAN control in Ethernet LANs.)

Since the IB architecture allows full in-band configuration and maintenance of an IB subnet via SMPs, the SMPs themselves are not subject to any partition membership restrictions. Thus, in order to avoid the possibility that any rough or compromised node on the IB fabric is able to define an arbitrary fabric configuration (including partition membership), other protection mechanisms are needed.

M_Keys can be used as the basic protection/security mechanism in the IB architecture for SMP access. An M_Key is a 64 bit value that can be associated individually with each individual node in the IB subnet, and where incoming SMP operations may be accepted or rejected by the target node depending on whether the SMP includes the correct M_Key value (i.e. unlike P_Keys, the ability to specify the correct M_Key value—like a password—represents the access control).

By using an out-of-band method for defining M_Keys associated with switches, it is possible to ensure that no host node is able to set up any switch configuration, including partition membership for the local switch port. Thus, an M_Key value is defined when the switch IB links becomes operational. Hence, as long as the M_Key value is not compromised or "guessed" and the switch out-of-band access is secure and restricted to authorized fabric administrators, the fabric is secure.

Furthermore, the M_Key enforcement policy can be set up to allow read-only SMP access for all local state information except the current M_Key value. Thus, it is possible to protect the switch based fabric from un-authorized (re-)configuration, and still allow host based tools to perform discovery and diagnostic operations.

The flexibility provided by the IB architecture allows the administrators of IB fabrics/subnets, e.g. HPC clusters, to decide whether to use embedded SM instances on one or more switches in the fabric and/or set up one or more hosts on the IB fabric to perform the SM function. Also, since the wire protocol defined by the SMPs used by the SMs is available through APIs, different tools and commands can be implemented based on use of such SMPs for discovery, diagnostics and control independently of any current Subnet Manager operation.

From a security perspective, the flexibility of IB architecture indicates that there is no fundamental difference between root access to the various hosts connected to the IB fabric and the root access allowing access to the IB fabric configuration. This is fine for systems that are physically secure and stable. However, this can be problematic for system configurations where different hosts on the IB fabric are controlled by different system administrators, and where such hosts should be logically isolated from each other on the IB fabric.

Allow Fabric to be Divided into Multiple Domains

An IB fabric can be divided into multiple independent domains, e.g. multiple subnets and/or multiple sub-subnets within one or more subnets. The complete fabric can have a topology and a corresponding global routing that ensures deadlock freedom for any combination of intra- and inter-domain communication flows.

Furthermore, the IB fabric with different domains can support subnet manager high availability (HA) configuration, subnet manager version upgrade, and core configuration parameters. The fabric can support a global unique identifier (GUID) based end-point identification within each different sub-subnet, and allows the path lookup to have fabric global scope. Additionally, the partition configuration, e.g. the allocation of P_Key values and the associated protection usage, can be coordinated throughout the global fabric.

Figure 2:
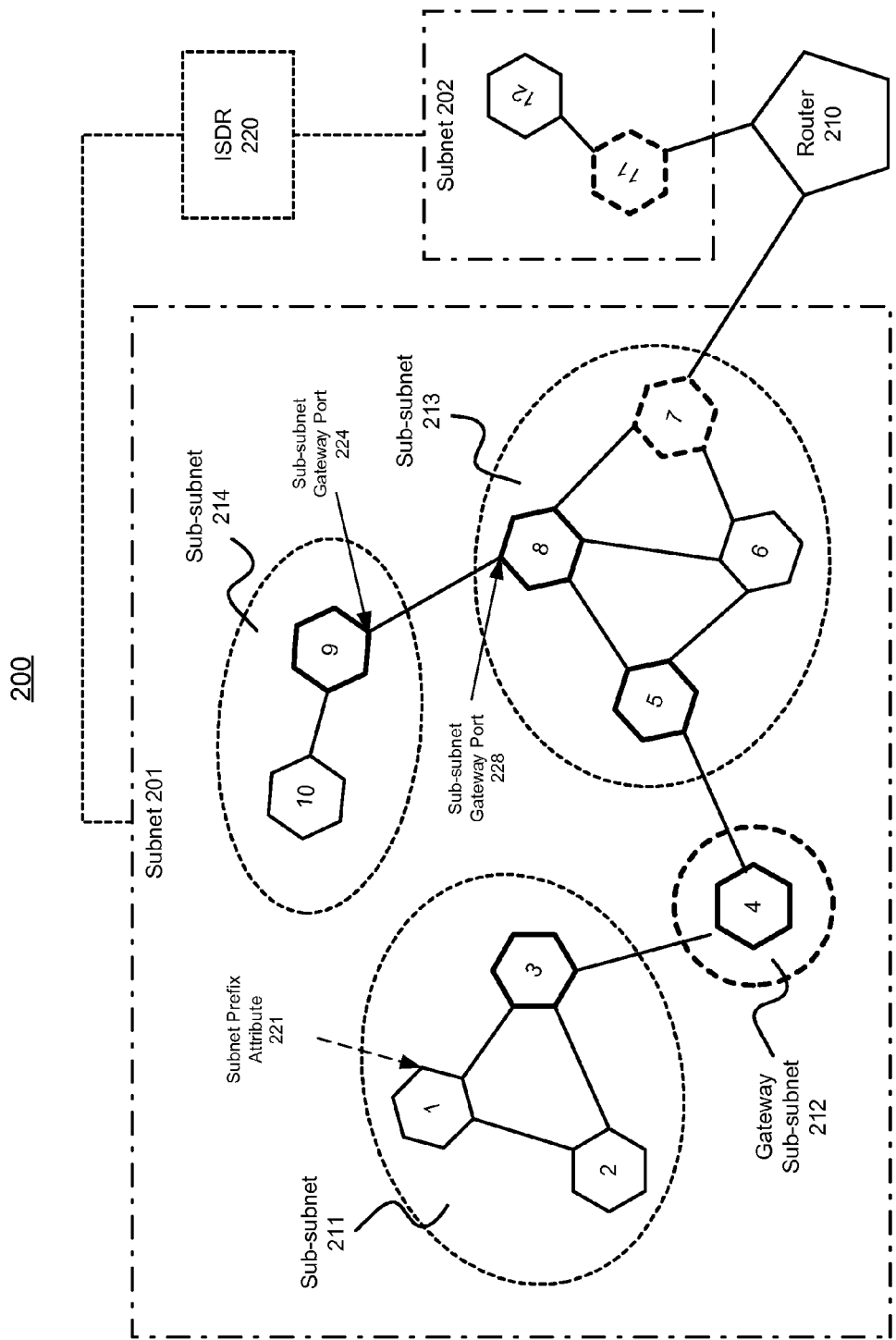
FIG. 2 shows an illustration of supporting multiple independent domains in an IB fabric in accordance with an embodiment of the invention.

FIG. 2 shows an illustration of supporting multiple independent domains in an IB fabric in accordance with an embodiment of the invention. As shown in FIG. 2, a fabric 200 includes one or more subnets 201-202, which are connected by different router ports on one or more router nodes 210. Here, the subnet 201 in the fabric 200 contains the switch nodes 1-10, whereas the subnet 202 contains the switch nodes 11-12. The discovery of a subnet gateway switch, e.g. the switch nodes 7 and 11, can be based on a discovery of a router port on the router 210 by a SM.

Furthermore, the subnet 201 in the fabric 200 can be divided into multiple independent sub-subnets 211-214. For example, the sub-subnet 211 includes the switch nodes 1-3, the sub-subnet 213 includes the switch nodes 5-8, and the sub-subnet 214 includes the switch nodes 9-10. The sub-subnets 211-214 can be connected by different sets of gateway switch nodes where each gateway switch node belongs to exactly one sub-subnet. For example, the sub-subnets 213 and 214 are separated by a set of gateway switch nodes 8 and 9, whereas the gateway switch node 8 belongs to the sub-subnet 213 and the gateway switch node 9 belongs to the sub-subnet 214.

Further, as shown in FIG. 2, the subnet 201 can include an independent gateway sub-subnet 212 between two ordinary sub-subnets 211 and 213. The gateway sub-subnet 212 is a special construction in the fabric that can support a management model similar to the router model. Thus, the connectivity through the gateway sub-subnet 212 can be managed independently from the ordinary sub-subnets 211 and 213 in a way that is similar to ordinary routers that can be managed independently of the subnets they connect to.

Each sub-subnet 211-214 in the fabric 200 can be independently discovered and routed, and there can be a different set of redundant SMs, or sub-subnet managers (SSMs), operating in each sub-subnet 211-214. The discovery of a sub-subnet gateway switch in a sub-subnet, e.g. switch node 3 in the sub-subnet 211, can be based on discovering a (remote) switch port that has non-local M_Key protection by a local SM. This non-local M_Key protection can have a subnet prefix that is within a defined set of known neighbor sub-subnet prefixes, but is different from the local sub-subnet prefix. Additionally, LID space (e.g. legacy 16 bit) can be shared between sub-subnets within the same subnet.

Additionally, a subnet prefix attribute 221, which can be the SMA port information attribute for a switch management port, can be used to record a sub-subnet number. This subnet prefix attribute 221 can be used to contain both a subnet number and a sub-subnet number, e.g. containing the subnet number in one part of the subnet prefix attribute and containing the sub-subnet number another non-overlapping part of the subnet prefix attribute.

In accordance with an embodiment of the invention, an inter-domain discovery and routing engine, e.g. a special inter-(sub)subnet discovery and routing engine (ISDR) 220, can be responsible for establishing a global fabric view. Using the ISDR, the domain gateway ports in the fabric, e.g. the subnet gateway ports and the sub-subnet gateway ports, can be identified, and the overall global fabric connectivity and topology can be determined based on the topologies of each (sub-)subnet and the inter(sub-)subnet connectivity.

The ISDR can operate in either a fixed-route mode or an on-demand-route mode.

In the fixed-route mode, the ISDR can analyze the topology, and determine if a suitable routing engine exists. Then, the ISDR can establish a deadlock free routing with one or more paths between all relevant end-ports (i.e. just like an SM can do for a single subnet).

In the fixed-route mode, a re-routing of a subnet or a sub-subnet may involve a re-routing of the complete fabric. Sub-paths can be established between the local end-ports within each sub-subnet. Furthermore, routes can be established within each subnet between the relevant gateway ports in a manner similar to a normal pair of end-ports. Then, these routes and sub-paths can be utilized to establish the end-to-end paths from local endpoints to remote end-ports. Here, in a sub-subnet, additional remote end-points can be set up by handling the relevant remote destination local identifier (DLID) as an alias LID for the local gateway port, whereas in a subnet, the local router port LID is used as DLID.

In the on-demand route mode, the ISDR does not establish a routing until a request for a path between two end points is received. The ISDR can then determine which gateway paths can be used under what SL/VL constraints in each involved subnet and/or sub-subnet to establish a deadlock free end-to-end path.

In order to set up a route dynamically, the ISDR can select a combination (trace) of gateway ports that matches deadlock freedom and other criteria such as quality of service (QoS). Then, the ISDR can establish the path through each subnet by leveraging the existing sub-paths and/or establish new sub-paths through the various subnets and sub-subnets in cooperation with the relevant subnet managers.

In order to provide GUID and path information to SA clients in each subnet and/or sub-subnet, the local SA can first determine if both the source and destination endpoints belong to the local subnet and/or sub-subnet. If at least one endpoint belongs to a remote subnet and/or sub-subnet, the SA can query the ISDR for the fabric global view and then provide the relevant SA responses to the local SA client. Additionally, the ISDR can register for notifications from the local SMs for various subnets and/or sub-subnets and issue SA requests in order to maintain an accurate view of the global fabric state.

In accordance with an embodiment of the invention, fat-trees can be used for sub-subnetting a single IB fabric. Within each fat-tree, individual sub-trees can be configured as independent sub-subnets. Using the fat-trees, each sub-subnet can be optimally routed for intra-sub-subnet connectivity without having a global fabric scope. Also, adding more sub-subnets does not impose a deadlock danger as long as the strict up-down routing regime is observed and the strict hierarchical fat-tree topology is maintained.

The balance between inter-sub-subnet traffic and deadlock freedom for routes between peers in a fabric can be achieved, e.g. using up-down link hierarchies. The inter-subnet and inter-sub-subnet communication can have fabric wide unique P_Key values, i.e. the P_Key values can be allocated from a fabric global pool. For both sub-subnetting and subnetting cases, it is possible to have a non-unique per subnet and/or per sub-subnet private P_Key value range as long as the private P_Key is only used for intra-domain communication.

Additionally, gateway implementations can facilitate direct communication between peers that do not share a common partition but use relevant secure mapping functions, e.g. via a transparent handling of packet invariant cyclic redundancy check (ICRC). The gateway implementations can support using virtual global unique identifiers (vGUIDs) in multiple subnets and/or sub-subnets. Also, the gateway implementations can support using vGUIDs within individual partitions that may or may not span across multiple subnets and/or sub-subnets.

In accordance with an embodiment of the invention, the route connectivity can be dynamically maintained within a fabric in a way that ensures that only accredited components and connectivity is utilized. Thus, the components and connectivity that are not yet accredited may be ignored in a way similar to the handling of accidental connectivity. Unlike the handling of accidental connectivity, the complete connectivity may be explored, and represented within the local sub-subnet in controlled rerouting, even though the routing and path set-up logic may not take such connectivity into account.

Figure 3:
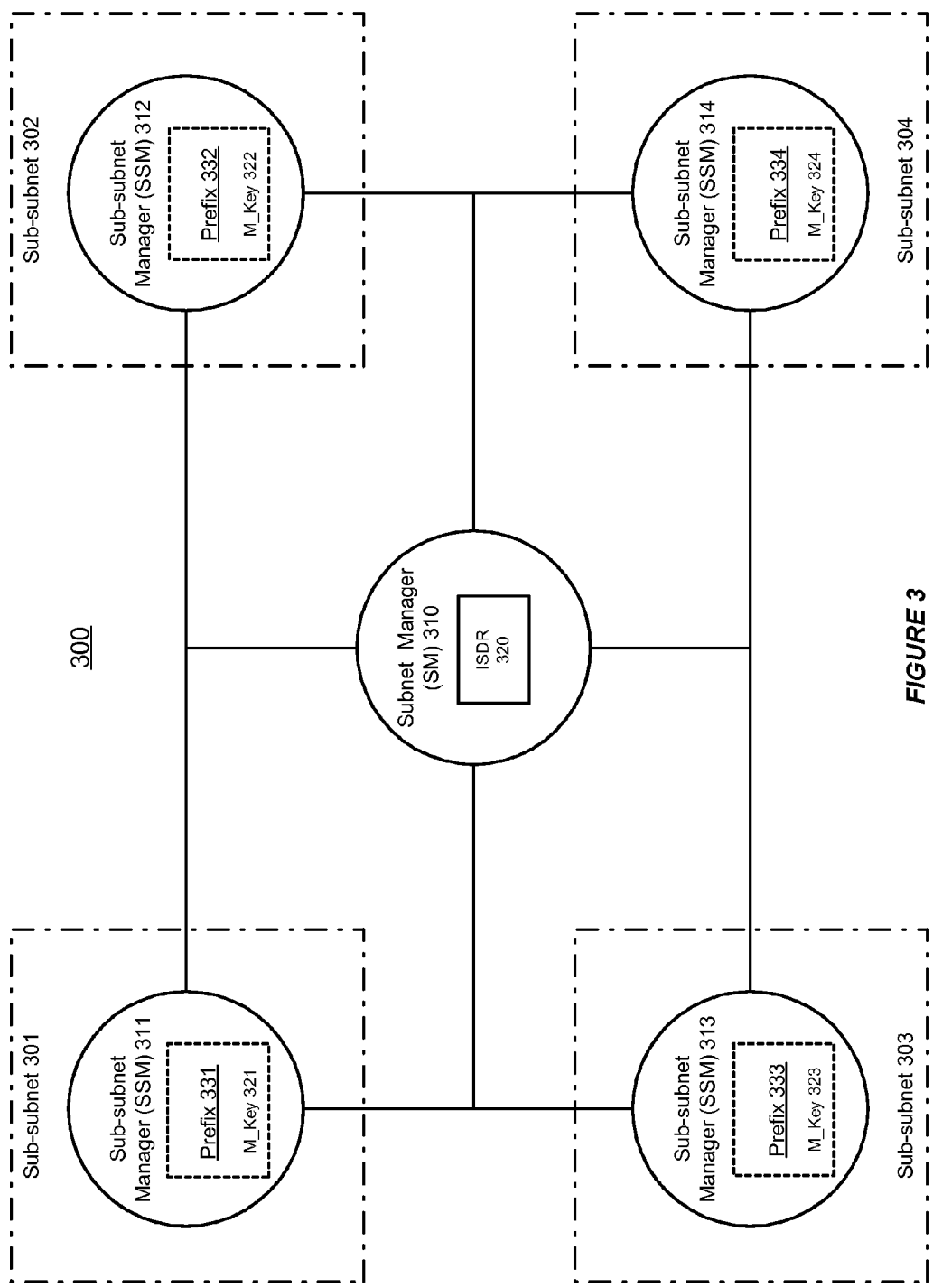
FIG. 3 shows an illustration of two step sub-subnet initialization in an IB fabric in accordance with an embodiment of the invention.

FIG. 3 shows an illustration of two step subnet initialization in an IB fabric in accordance with an embodiment of the invention. As shown in FIG. 3, a subnet in an IB fabric 300 includes multiple sub-subnets 301-304, each of which is managed by a sub-subnet manager (SSM) 311-314 that is associated with a unique M_key 321-324.

During the two-step subnet initialization, only the designated management nodes, e.g. the SSMs 311-314, may be allowed to communicate with each other at the first step. The policies for the connectivity between other nodes in each sub-subnet can be established in-band between the SSMs, e.g. via Internet Protocol over InfiniBand (IPoIB), before all nodes are set up at the second step.

In accordance with an embodiment of the invention, each of the M_keys 321-324 can be associated with a different (sub-)subnet prefix 331-334. Having the prefix 331-334 or a sub-subnet number encoded as part of the M_Key 321-324 may require that a remote sub-subnet M_Key is exposed to (or known by) a different remote sub-subnet manager, which may be in conflict with ensuring isolation and protection among sub-subnet managers in different sub-subnets.

Furthermore, each sub-subnet 301-304 can have a different M_Key value range, which can be used along with the per individual SM instance private M_Key value to ensure automatic fencing of old master SMs or SSMs after a standby SM or SSM takes over. Also, local port M_Keys can be updated to ensure that a runaway fabric component is not able to change or establish any fabric state until it has re-synched with relevant peers.

In accordance with an embodiment of the invention, there can be a designated SM 310 that is responsible for managing the subnet 300. Additionally, the designated SM 310 can maintain an ISDR 320 for establishing a global fabric view.

Figure 4:
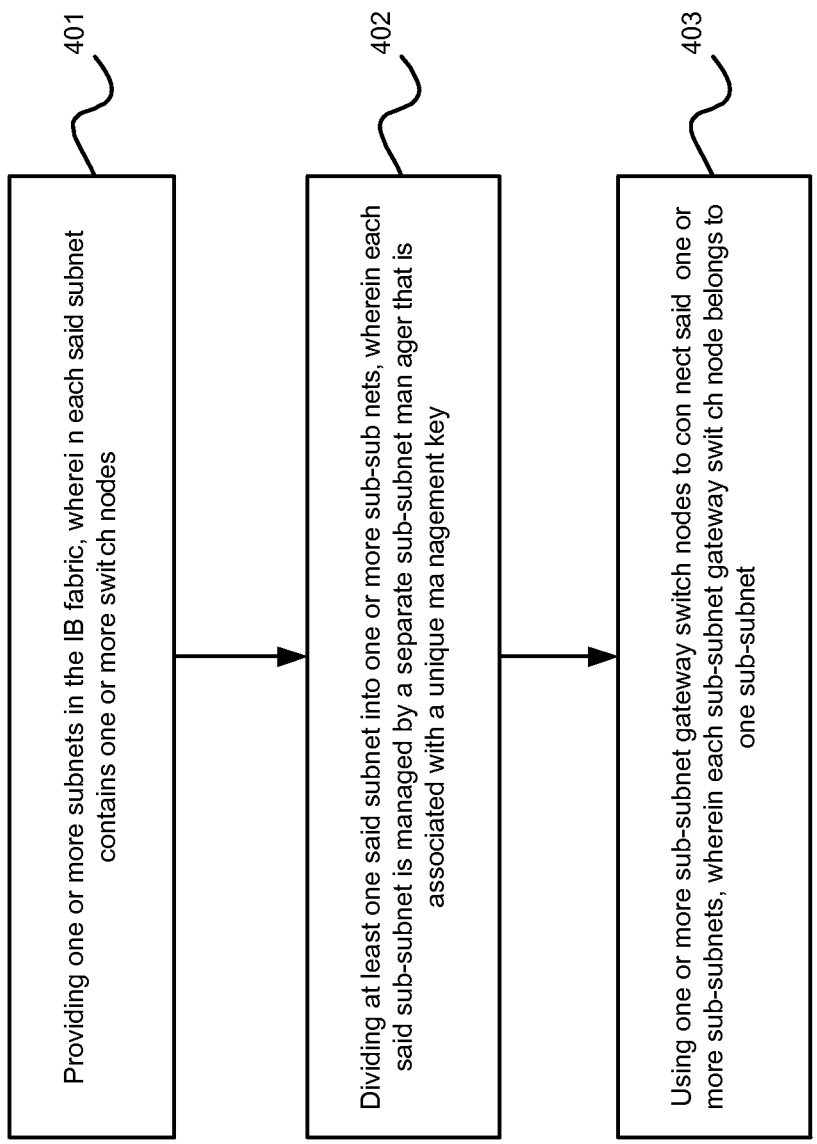
FIG. 4 illustrates an exemplary flow chart for supporting multiple independent domains in an IB fabric in accordance with an embodiment of the invention.

FIG. 4 illustrates an exemplary flow chart for supporting multiple independent domains in an IB fabric in accordance with an embodiment of the invention. As shown in FIG. 4, at step 401, one or more subnets can be provided in the IB fabric, wherein each said subnet contains one or more switch nodes. Then, at step 402, at least one said subnet can be divided into one or more sub-subnets, wherein each said sub-subnet can be managed by a separate SSM that is associated with a unique management key. Finally, at step 403, one or more sub-subnet gateway switch nodes can connect said one or more sub-subnets, wherein each sub-subnet gateway switch node belongs to one sub-subnet.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting multiple domains in an InfiniBand (IB) fabric, comprising:
an inter-domain discovery and routing engine (ISDR) that is responsible for establishing a global fabric view and establishing a deadlock free routing with one or more paths between different end-ports in the IB fabric wherein the ISDR operates in either a fixed-route mode or an on-demand-route mode, and wherein,
in the fixed-route mode, the ISDR analyzes the topology, and determines if a suitable routing engine exists, and
in the on-demand-route mode, the ISDR does not establish a routing until a request for a path between two end points is received;

one or more subnets, wherein each said subnet contains one or more switch nodes, wherein at least one said subnet is adapted to be divided into one or more sub-subnets, wherein each said sub-subnet is managed by a separate sub-subnet manager that is associated with a unique management key, and wherein said one or more sub-subnets are connected by one or more sub-subnet gateway switch nodes, wherein each sub-subnet gateway switch node belongs to one sub-subnet.

2. The system according to claim 1, wherein:
said one or more subnets are connected by one or more router nodes, and wherein each said subnet includes a subnet gateway switch that is discovered based on a discovery of a router port on a router node.

3. The system according to claim 1, wherein:
at least one said sub-subnet is a gateway sub-subnet that is between two or more sub-subnets, and wherein connectivity through said gateway sub-subnet can be managed independently from said two or more sub-subnets.

4. The system according to claim 1, wherein:
a said sub-subnet gateway switch node can be discovered by a sub-subnet manager in the sub-subnet, when the sub-subnet manager discovers a switch port that has a non-local management key protection, wherein the non-local management key protection has a subnet prefix that is within a defined set of known neighbor sub-subnet prefixes.

5. The system according to claim 1, wherein:
a sub-subnet number is encoded as part of a management key.

6. The system according to claim 1, wherein:
a subnet prefix attribute associated with a switch management port can represent a sub-subnet number, and wherein one part of the subnet prefix attribute contains a subnet number and another non-overlapping part of the subnet prefix attribute contains the sub-subnet number.

7. The system according to claim 1, wherein:
a sub-subnet gateway switch node is allowed to have at least one sub-subnet gateway port connecting to another sub-subnet gateway switch, and
a subnet gateway switch is allowed to have at least one subnet gateway port connecting to a router port.

8. The system according to claim 1, wherein:
said one or more subnets comprise at least two subnets; and
wherein said at least two subnets are adapted to be divided into two or more sub-subnets, wherein each said sub-subnet is managed by a separate sub-subnet manager that is associated with a unique management key, and
wherein said two or more sub-subnets are connected by two or more sub-subnet gateway switch nodes, wherein each sub-subnet gateway switch node belongs to only one sub-subnet.

9. The system according to claim 8, wherein:
each of said at least two subnets includes a sub-subnet manager, wherein the sub-subnet manager identifies sub-subsets by discovering said two or more sub-subnet gateway switch nodes wherein said two or more sub-subnet gateway switch nodes have non-local management key protection, and wherein the non-local management key protection has a sub-subnet prefix that is within a defined set of known neighbor sub-subnet prefixes.

10. The system according to claim 1, wherein:
during fabric initialization, the sub-subnet managers are allowed to communicate with each other before other nodes are set up.

11. A method for supporting different domains in an InfiniBand (IB) fabric, comprising:
providing an inter-domain discovery and routing engine (ISDR) that is responsible for establishing a global fabric view and establishing a deadlock free routing with one or more paths between different end-ports in the IB fabric wherein the ISDR operates in either a fixed-route mode or an on-demand-route mode, and wherein,
in the fixed-route mode, the ISDR analyzes the topology, and determines if a suitable routing engine exists, and
in the on-demand-route mode, the ISDR does not establish a routing until a request for a path between two end points is received;
providing one or more subnets in the IB fabric, wherein each said subnet contains one or more switch nodes,
dividing at least one said subnet into one or more sub-subnets, wherein each said sub-subnet is managed by a separate sub-subnet manager that is associated with a unique management key, and
using one or more sub-subnet gateway switch nodes to connect said one or more sub-subnets, wherein each sub-subnet gateway switch node belongs to one sub-subnet.

12. The method according to claim 11, further comprising:
connecting said one or more subnets by one or more router nodes, wherein each said subnet includes a subnet gateway switch that is discovered based on a discovery of a router port on a router node.

13. The method according to claim 11, further comprising:
allowing at least one said sub-subnet to be a gateway sub-subnet that is between two or more sub-subnets, and
managing connectivity through said gateway sub-subnet independently from said two or more sub-subnets.

14. The method according to claim 11, further comprising:
discovering a said sub-subnet gateway switch node by a sub-subnet manager in the sub-subnet, when the sub-subnet manager discovers a switch port that has a non-local management key protection, and
allowing the non-local management key protection to have a subnet prefix that is within a defined set of known neighbor sub-subnet prefixes.

15. The method according to claim 11, further comprising:
encoding a sub-subnet number as part of a management key.

16. The method according to claim 11, further comprising:
allowing a subnet prefix attribute associated with a switch management port to represent a sub-subnet number, and wherein one part of the subnet prefix attribute contains a subnet number and another non-overlapping part of the subnet prefix attribute contains the sub-subnet number.

17. The method according to claim 11, further comprising:
allowing a sub-subnet gateway switch node to have at least one sub-subnet gateway port connecting to another sub-subnet gateway switch, and
allowing a subnet gateway switch to have at least one subnet gateway port connecting to a router port.

18. The method according to claim 11, comprising:
providing two or more subnets in the IB fabric, wherein each said subnet contains one or more switch nodes,
dividing at least one said subnet into two or more sub-subnets, wherein each said sub-subnet is managed by a separate sub-subnet manager that is associated with a unique management key, and
using two or more sub-subnet gateway switch nodes to connect said two or more sub-subnets, wherein each sub-subnet gateway switch node belongs to only one sub-subnet.

19. The method according to claim 11, further comprising:
allowing the sub-subnet managers to communicate with each other before other nodes are set up during fabric initialization.

20. A non-transitory machine readable storage medium having instructions stored thereon that when executed cause a system to perform the steps of:
providing an inter-domain discovery and routing engine (ISDR) that is responsible for establishing a global fabric view and establishing a deadlock free routing with one or more paths between different end-ports in the IB fabric wherein the ISDR operates in either a fixed-route mode or an on-demand-route mode, and wherein,
  in the fixed-route mode, the ISDR analyzes the topology, and determines if a suitable routing engine exists, and
  in the on-demand-route mode, the ISDR does not establish a routing until a request for a path between two end points is received;
providing one or more subnets in the IB fabric, wherein each said subnet contains one or more switch nodes,
dividing at least one said into one or more sub-subnets, wherein each said sub-subnet is managed by a separate sub-subnet manager that is associated with a unique management key, and
using one or more sub-subnet gateway switch nodes to connect said one or more sub-subnets, wherein each sub-subnet gateway switch node belongs to one sub-subnet.

\* \* \* \* \*

UNITED STATES PATENT AND TRADEMARK OFFICE
CERTIFICATE OF CORRECTION

PATENT NO.        : 8,743,890 B2
APPLICATION NO.   : 13/488133
DATED             : June 3, 2014
INVENTOR(S)       : Johnsen et al.

Page 1 of 1

It is certified that error appears in the above-identified patent and that said Letters Patent is hereby corrected as shown below:

On the title page, in figure 1, line 1, delete "con nectivity" and insert -- connectivity --, therefor.

In the Drawings

On sheet 4 of 4, in figure 4, under Reference Numeral 401, line 1, delete "wherei n" and insert -- wherein --, therefor.

On sheet 4 of 4, in figure 4, under Reference Numeral 402, line 1, delete "sub-sub nets," and insert -- sub-subnets, --, therefor.

On sheet 4 of 4, in figure 4, under Reference Numeral 402, line 2, delete "man ager" and insert -- manager --, therefor.

On sheet 4 of 4, in figure 4, under Reference Numeral 402, line 3, Delete "ma nagement" and insert -- management --, therefor.

On sheet 4 of 4, in figure 4, under Reference Numeral 403, line 1, Delete "con nect" and insert -- connect --, therefor.

On sheet 4 of 4, in figure 4, under Reference Numeral 403, line 2, delete "swit ch" and insert -- switch --, therefor.

In the Specification

In column 1, line 42, delete "Forschungszcntrum" and insert -- Forschungszentrum --, therefor.

In column 7, line 1, delete "Additinally," and insert -- Additionally, --, therefor.

Signed and Sealed this
Tenth Day of February, 2015

Michelle K. Lee
*Deputy Director of the United States Patent and Trademark Office*